United States Patent [19]
Preston

[11] 3,991,625
[45] Nov. 16, 1976

[54] GRAVITY-MEASURING DEVICE FOR WATER AND MINERAL DETECTION

[76] Inventor: James N. Preston, 1633 W. Campbell, Phoenix, Ariz. 85015

[22] Filed: Nov. 10, 1975

[21] Appl. No.: 630,680

[52] U.S. Cl. .................................................. 73/382
[51] Int. Cl.² .......................................... G01V 7/12
[58] Field of Search .................... 73/382, 517 B, 142

[56] References Cited
UNITED STATES PATENTS

| | | | |
|---|---|---|---|
| 2,964,949 | 12/1960 | Wilcox | 73/503 X |
| 3,062,051 | 11/1962 | Slater et al. | 73/382 |
| 3,161,064 | 12/1964 | Johnston | 73/503 X |

Primary Examiner—James J. Gill

[57] ABSTRACT

The invention is comprised of an electric motor and generator whose moving parts are connected to each other by torque-transmitting means so that the torque of the electric motor and the resistance of the electric generator operates to lift either the electric motor or generator for a distance against the force of gravity. The distance is determined by a mercury-type electric switch and the differences in gravity at different places above the Earth are measured both by a motor ampmeter and a generator ampmeter to detect minerals and water beneath the surface of the Earth.

2 Claims, 2 Drawing Figures

GRAVITY-MEASURING DEVICE FOR WATER AND MINERAL DETECTION

The object of the invention is set forth in both the title and the abstract of the invention wherein the variations in electric current required by the electric motor from any source of electric current to lift either the electric motor or generator for a distance above the Earth and the variations in the electric current produced by an electric generator, powered by the electric motor, are measured by ampmeters to detect differences in gravity force at different places on the Earth so as to detect minerals and water beneath the surface of the Earth.

Referring to the drawing.

Figure 1:
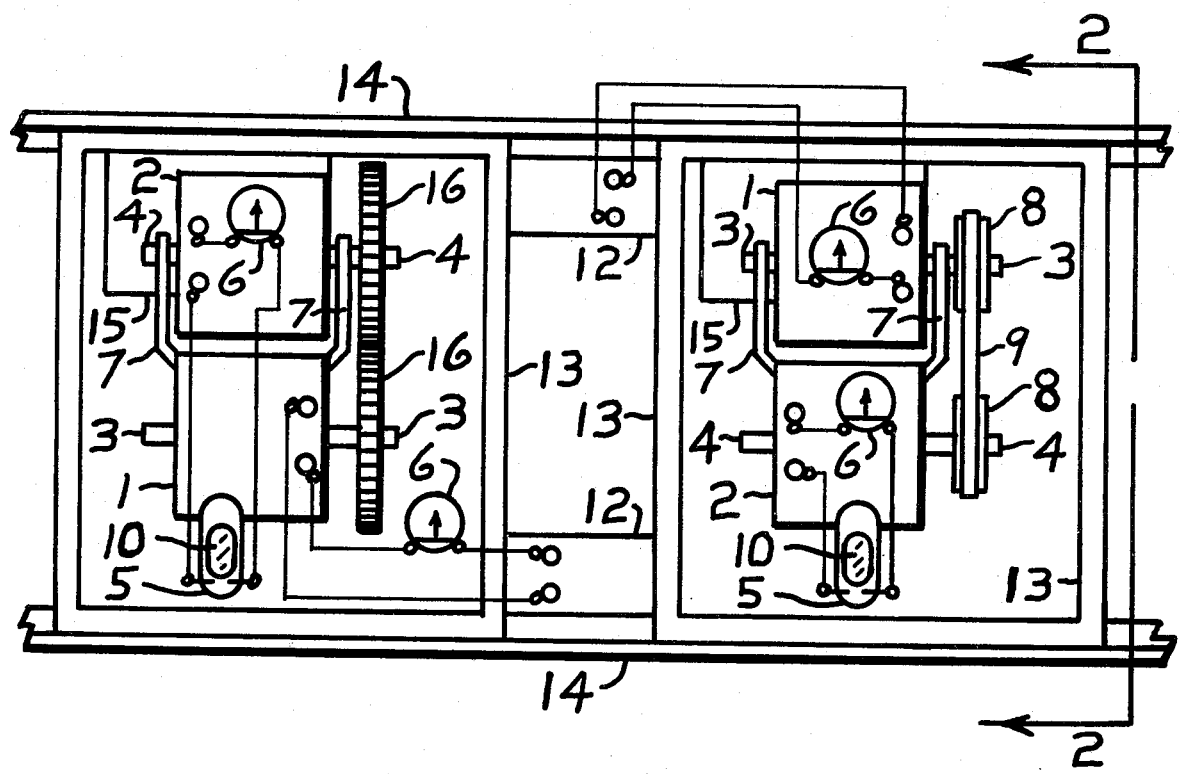
FIG. 1 shows a plan view of the device.

Referring to the drawing in more detail, FIG. 1 represents the electric motor mounted on motor mount 15 which is fastened to the frame 13 which is mounted to support beams 14. FIG. 3 represents the axle of the motor 1. Electric current from batteries 12 is conducted through wires A,B to the electric motor 1. The ampmeter 6 is electrically-connected in circuit A between the battery 12 and motor 1. The electric generator housing 2 is supported by the affixed arms 7 which extend to the axle 3 of the electric motor 1 where the generator 2 and arms 7 are rotatably mounted on the motor axle 3 through ball bearings so that the generator housing and arms 7 are free to swing around the axle 3 and housing 1 of the electric motor 1. Pulley 8 of the electric motor 1 is connected to pulley 8 of the axle 4 of generator 2 by the pulley belt 9 so that the axle 3 of motor 1 operates to rotate the axle 4 of generator 2 when electricity is supplied to motor 1. Electricity from the generator 2 is electrically conducted by electric wiring 17 through ampmeter 6 and through mercury-type electric switch 5 through a circuit leading from electric terminal of the generator 2 to the other terminal of said generator 2. The mercury-type electric switch is fastened to the generator housing 2 so that the mercury-type electric switch is horizontal with the ground when the housing 2 of the generator is in a plane horizontal with that of the electric motor 1 above the ground. The transparent mercury-type electric switch shows the location of the mercury in FIGS. 1 and 2 when the mercury is electrically completing the electric circuit between the electric terminals of the generator 2 as the resistance of the generated electric circuit of the electric generator 2 resists the torque of the electric motor axle 3 as it is conducted through pulleys 8 and pulley belt 9 to the axle 4 of generator 2. At this point where the generator becomes horizontal with the motor 1, the mercury 10 in transparent mercury-type electric switch 5 rolls along the mercury switch 5 in the direction away from contact points of the generator circuit and electrically-disconnects said circuit. This action recurs constantly to maintain the generator housing 2 in the horizontal position and the ampere reading of the current in the ampmeter 6 indicates how much electric current is required to maintain the horizontal position of the generator 2 above any part of the surface of the Earth. The ampere reading of the motor circuit AB ampmeter 6 also indicates the relative strength of the gravitational force at any part of the Earths surface by the amount of electric current is required from battery 12 by the electric motor 1 to maintain the generator housing 2 in the horizontal position each time.

Figure 2:
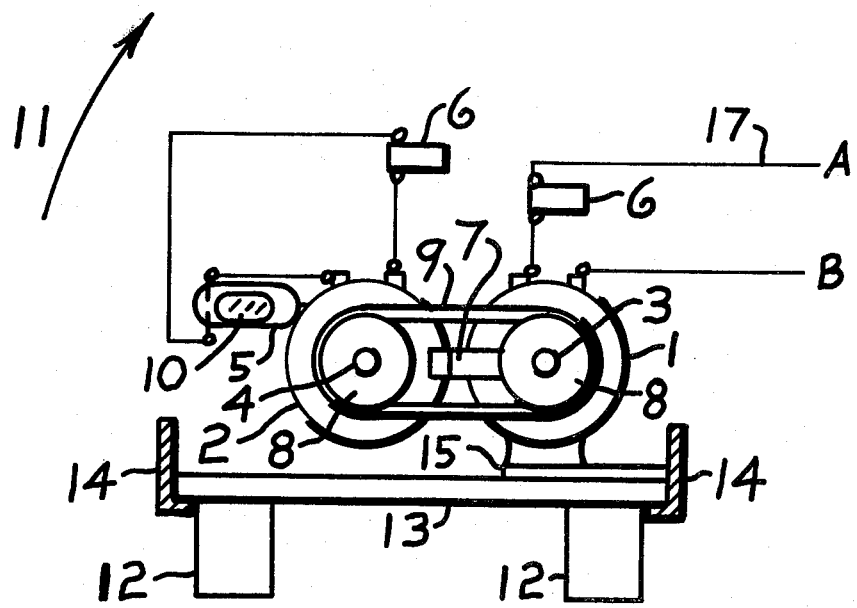
FIG. 2 shows a side view of the device as viewed along lines 2—2 of FIG. 1.

The second unit of the device, not shown in FIG. 2, operates similar to the operation of the first unit of the device to show more than one version of the same device. The generator housing 2 is fastened to the motor mount 15 and the electric motor 1 is suspended from the axle 4 of the generator 2 through arms 7 which are fastened to the motor housing 1 and swing freely around the axle 4 of the generator 2. The motor 1 in both the first and second units turns clockwise 11. In the second unit, the axle 4 of the generator 2 is connected to the axle 3 of the motor 1 through the gears 16 which are fastened to the respective axles 3,4. Electric current from the terminals of the generator 2 again is conducted from one terminal to the other through the ampmeter 6 and the mercury-type electric switch 5 but the mercury-type electric switch is located on the motor 1 so that the mercury 10 electrically-disconnects the generator circuit whenever the motor torque operates to raise the motor housing 1 to the horizontal position parallel to the plane of the ground and the horizontal plane of the generator 2 each time in opposition to the axle resistance of the electric generator 2. The operation of the second unit is identical to that of the first unit, otherwise. In the second unit, the generator axle 4 turns counterclockwise. The unit is carried from place to place over the surface of the Earth through support beams 14.

Having thus described the invention, the following is claimed:

1. A portable gravity-measuring device comprising: any portable source of electrical current being electrically-connected to an electric motor through electric wiring and meter means to measure and indicate the amount of electric current flow through the circuit; the electric motor being fastened to a portable frame; one or more arms being rotatably suspended from the axle of the electric motor through bearing means and fastened to the housing of an electric generator so that the generator and arms swing freely around the axle of the electric motor; the generator axle being connected to the motor axle through torque transmitting means so that the axle of the motor operates to turn the axle of the generator when the motor is activated with electricity; electricity generated by the electric generator being conducted from one electrical terminal to the other electric terminal of the generator through an electric circuit that includes meter means and electric switching means in the circuit, wired in series circuit; the electric switching means being fastened to the generator and activated by the force of earth gravity so that it operates to electrically-connect the generator circuit from one terminal to the other whenever the generator is located in a lower plane than the horizontal plane of the electric motor and then disconnects the electric current in said circuit whenever the torque of the electric motor and resistance of the electric generator swings the electric generator around to an elevation equal to that of the motor above the level of the earth; when moved from place to place above the surface of the earth, variations in the current reading of the motor circuit and variations in the current reading of the generator circuit through their respective meter means both indicate variations in the force of gravity intensity of minerals and water or the lack of them beneath the surface of the earth.

2. A portable gravity-measuring device comprising: the device including an electric motor that is powered by any portable source of electricity whose electric circuit between electricity source and motor including electric meter means to measure the electric flow from source to motor; the device including an electric generator that is fastened to a portable frame; one or more arms being rotatably-suspended at one end from the axle of the electric generator through bearings, such as ball bearings, to allow the arms to freely swing for a distance around the generator axle; the other ends of the arms being fastened to the housing of the electric motor so that the electric motor also being free to swing for a distance around the axle of the generator; the device including torque-transmitting means that connect the axle of the electric generator to the axle of the electric motor so that the energized electric motor operates to rotate the axle of the electric generator; an electric circuit that includes electric meter means and electric switching means, wired in series circuit, electrically-connecting one electric terminal of the electric generator to the other electric terminal; the electric switching means being fastened to the motor and located thereat so that it is normally-closed when the electric motor hangs suspended from the axle of the electric generator; the electric switching means operating through the force of earth gravity to electrically-disconnect the generator electric circuit whenever the electric motor is moved by the electric motor torque and the resistance to rotation of the generator axle, caused by its generation of electric current, to an elevated position above the earth equal to the level of the electric generator; reaching the elevated horizontal position, the electric motor and its electric switching means operate to disconnect the electric generator circuit each time to maintain the electric motor in the said elevated position equal to the level of the generator; readings of both the meter means in the motor circuit in the operation of the motor and the readings of the meter means in the generator circuit operate to indicate differences in the gravity intensity of water and minerals beneath the surface of the earth when the device is moved from place to place around the surface of the earth to indicate the presence and absence of minerals and water buried beneath the surface of the ground.

* * * * *